United States Patent [19]

Ogawa et al.

[11] 4,121,197

[45] Oct. 17, 1978

[54] MATRIX CIRCUIT FOR AN ELECTROSTATIC RECORDING DEVICE COMPRISING CROSS-POINT ELEMENTS FOR DRIVING EACH PAIR OF CONTROL ELECTRODES ON A COMMON MATRIX CONDUCTOR

[75] Inventors: Takashi Ogawa; Kazunori Kimura, both of Tokyo, Japan

[73] Assignee: Nippon Electric Co., Ltd., Tokyo, Japan

[21] Appl. No.: 774,563

[22] Filed: Mar. 4, 1977

[51] Int. Cl.² .............................................. H04G 5/00
[52] U.S. Cl. ............................. 340/166 R; 340/324 M
[58] Field of Search ....................... 340/166 R, 324 M

[56] References Cited

U.S. PATENT DOCUMENTS

| | | | |
|---|---|---|---|
| 3,555,511 | 1/1971 | Flippazzi | 340/166 R |
| 3,689,910 | 9/1972 | Glaser | 340/324 M |
| 3,921,140 | 11/1975 | Houston | 340/166 R |

*Primary Examiner*—Harold I. Pitts

*Attorney, Agent, or Firm*—Sughrue, Rothwell, Mion, Zinn and Macpeak

[57] ABSTRACT

In a matrix circuit for an electrostatic recording device comprising a sequence of control electrodes, cross-point elements to be selected in pairs to cyclically drive the control electrodes, with two consecutive ones in the sequence driven at each instant, are arranged always along a common matrix conductor. The cross-point elements for the sequential control electrodes may be arranged in a reciprocating or a staggering manner along each pair of the matrix conductors, in a spiral manner passing through all matrix points, or in a somewhat irregular manner. The cross-point elements may be selected, with one of the pair for driving the trailing one of the two consecutive control electrodes again selected at the next succeeding instant together with another cross-point element for the control electrode next following in the sequence the trailing control electrode, by a logic circuit driven by a counter for counting clock pulses defining the instants.

4 Claims, 10 Drawing Figures

FROM MATRIX CIRCUIT 4,121,197

MATRIX CIRCUIT FOR AN ELECTROSTATIC RECORDING DEVICE COMPRISING CROSS-POINT ELEMENTS FOR DRIVING EACH PAIR OF CONTROL ELECTRODES ON A COMMON MATRIX CONDUCTOR

BACKGROUND OF THE INVENTION

This invention relates to a matrix circuit for cyclically driving in an electrostatic recording device a sequence of control electrodes, two at each instant.

An electrostatic recording device comprises a multiplicity of aligned stylus electrodes and a conductive member along the stylus electrodes to record an electrostatic image on a recording medium placed in an electrostatic field formed between the stylus electrodes and the conductive member. Usually, the conductive member is divided into a sequence of control electrodes. In order to cyclically drive the control electrodes at successive time slots, two consecutive ones in the sequence at each time slot, use is made of a matrix circuit to which this invention is applicable.

A matrix circuit generally comprises a plurality of matrix conductors, namely, a plurality of row conductors and a plurality of column conductors crossing the row conductors without ohmic contact therewith to form a matrix or cross points, and a plurality of cross-point elements adjacent the respective cross points. For use in an electrostatic recording device comprising a sequence of control electrodes, the cross-point elements are assigned to the control electrodes in one-to-one correspondence. Only two of the cross-point elements are selected at each time slot to drive the two consecutive control electrodes. It is, however, inevitable with a conventional matrix circuit for general purposes that spurious cross-point elements in excess of two are undesiredly selected at a certain time slot as will later be described with reference to one of several figures of the accompanying drawing. Another conventional matrix circuit proposed specifically for an electrostatic recording device being dealt with is capable of avoiding the spurious selection. The proposed matrix circuit, however, is complicated in structure as will also be described hereunder with reference to another figure of the accompanying drawing. The operation is also complicated particularly when one of the two consecutive control electrodes that next follows in the sequence the other has to be continuously driven at the next succeeding time slot together with another of the control electrodes that next follows in the sequence the said one control electrode.

SUMMARY OF THE INVENTION

It is therefore an object of the present invention to provide a matrix circuit capable of readily driving a sequence of control electrodes of an electrostatic recording device at successive time slots, with two consecutive control electrodes in the sequence driven at each time slot and with one of the two consecutive control electrodes next following in the sequence the other continuously driven at the next succeeding time slot together with another control electrode next following in the sequence the said one control electrode.

It is another object of this invention to provide a matrix circuit of the type described, which is capable of avoiding spurious selection of the control electrodes and yet simple in structure and operation.

It is a further object of this invention to provide a matrix circuit of the type described, wherein a pair of cross-point elements of the circuit is selected by only three selection signals.

According to this invention, there is provided a matrix circuit to be used in an electrostatic recording device comprising a multiplicity of aligned stylus electrodes and a sequence of control electrodes along the stylus electrodes. For cyclically driving the control electrodes at successive time slots, with two consecutive control electrodes in the sequence driven at each of the time slots and with one of the two consecutive control electrodes next following in the sequence the other of the two consecutive control electrodes continuously driven at the next succeeding time slot together with the control electrode next following in the sequence the said one of the two consecutive control electrodes, the matrix circuit comprises a plurality of conductors of a first set, a plurality of conductors of a second set successively crossing the first set of conductors without ohmic contact therewith to form a plurality of cross points, and a plurality of cross-point elements adjacent the respective cross points in one-to-one correspondence with the control electrodes. Each of the cross-point elements bridges one each of the first-set and second-set conductors crossing at one of the cross points that is adjacent to the said each cross-point element. The matrix circuit further comprises means for supplying selection signals selectively to the first-set and second-set conductors to select a pair of the cross-point elements at each of the time slots. The cross-point elements drive the corresponding control electrodes when selected. This invention is characterized in that all of the cross-point elements to be selected in pair are arranged to bridge one of the conductors of one of the first and second sets and two respective ones of the conductors of the other of the sets.

DESCRIPTION OF THE PREFERRED EMBODIMENTS

Figure 1:
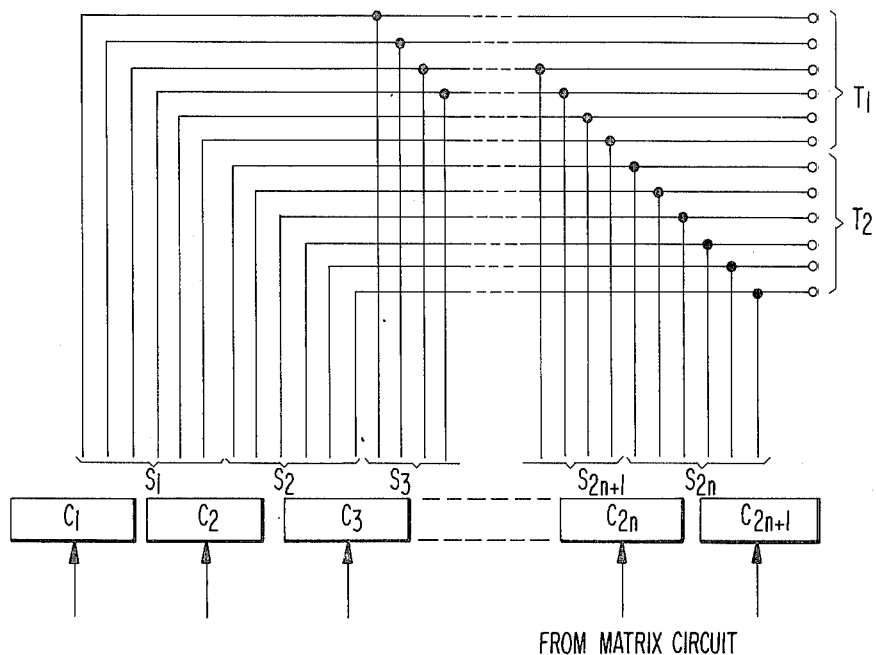
FIG. 1 schematically shows a generic electrostatic recording device in which a matrix circuit according to the present invention is to be used.

Referring to FIG. 1, a generic electrostatic recording device in which a matrix circuit according to the present invention is to be used comprises a multiplicity of aligned stylus electrodes (for example, 1680 in number )

divided into first and other odd-numbered groups $S_1$, $S_3$, ..., and $S_{2n-1}$ and second and other even-numbered groups $S_2$, ..., and $S_{2n}$ and a plurality of signal input terminals divided into first and second groups $T_1$ and $T_2$. The first group of input terminals $T_1$ are connected to the respective stylus electrodes of the odd-numbered groups $S_1$–$S_{2n-1}$, while the second group of input terminals $T_2$ are connected to the respective stylus electrodes of the even-numbered groups $S_2$–$S_{2n}$. The input terminals $T_1$ and $T_2$ are cyclically supplied with signals to be recorded. The device further comprises a sequence of first, second, third, ..., $2n$-th, and last or $(2n-1)$-th control electrodes $C_1$, $C_2$, $C_3$, ..., $C_{2n}$, and $C_{2n-1}$ along the stylus electrodes $S_1$–$S_{2n}$. Despite the suffix $2n-1$ for the last control electrode $C_{2n-1}$ in the sequence, the number of the control electrodes $C_1$–$C_{2n-1}$ may be an even number, such as sixteen, in which case the stylus electrodes are divided into an odd number of groups. The control electrodes $C_1$–$C_{2n-1}$ are cyclically driven in successive time slots in the manner later described to electrostatically form in cooperation with the stylus electrodes $S_1$–$S_{2n}$ an electrostatic record on a recording medium (not shown) placed in an electrostatic field produced by the stylus electrodes $S_1$–$S_{2n}$ and the control electrodes $C_1$–$C_{2n-1}$ in compliance with the signals supplied to the input terminals $T_1$ and $T_2$.

Further referring to FIG. 1, it may be pointed out here that the stylus electrodes of each of the groups $S_1$–$S_{2n}$ are associated with two consecutive ones in the sequence of the control electrodes $C_1$–$C_{2n-1}$, such as the control electrodes $C_1$ and $C_2$ or $C_2$ and $C_3$. This is to compensate the otherwise unavoidable reduction of intensity of the electrostatic record at both ends of each control electrode. Therefore, two consecutive control electrodes should be driven at each time slot. Inasmuch as this device comprises a sequence of control electrodes $C_1$–$C_{2n-1}$ and a pair of input terminal groups $T_1$ and $T_2$, reduction is possible in the number of amplifiers (not shown) for supplying the signals to be recorded to the stylus electrodes $S_1$–$S_{2n}$. However, a matrix circuit is indispensable to cyclically drive the control electrodes $C_1$–$C_{2n-1}$, two at each time slot, in synchronism with the signals supplied to the input terminals $T_1$ and $T_2$. In addition, one of the two consecutive control electrodes driven at each time slot that next follows in the sequence the other must be continuously driven in the next succeeding time slot by the matrix circuit together with another control electrode immediately following in the sequence the said one control electrode (one, the other, and another being, for example, the control electrodes $C_2$, $C_1$, and $C_3$, respectively). In other words, each control electrode must be driven for two successive time slots during one complete period of drive of the control electrodes $C_1$–$C_{2n-1}$ except the first and last control electrodes $C_1$ and $C_{2n-1}$, each of which must be driven for only one time slot.

Figure 2:
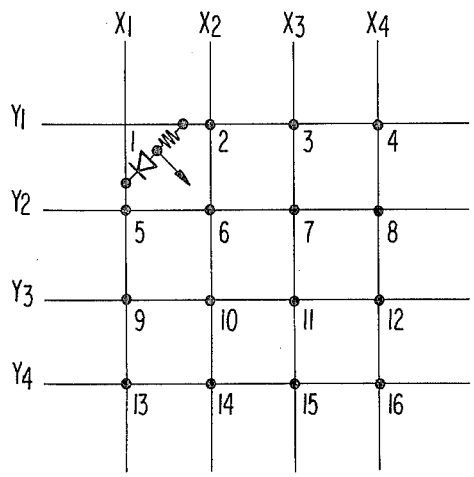
FIG. 2 shows a conventional matrix circuit for general purposes.

Referring to FIG. 2, description will be made of a conventional matrix circuit for general purposes for a better understanding of a matrix circuit according to this invention. In the illustrated example, the matrix circuit is a four by four matrix circuit and comprises first through fourth column conductors $X_1$, $X_2$, $X_3$, and $X_4$, first through fourth row conductors $Y_1$, $Y_2$, $Y_3$, and $Y_4$ successively crossing the first through fourth column conductors $X_1$–$X_4$ without ohmic contact with the column conductors $X_1$–$X_4$ to form sixteen cross points, and first through sixteenth cross-point elements 1–16 adjacent the respective cross points. Each cross-point element may comprise a series connection of a diode and a resistor as illustrated only for the first cross-point element 1. The series connection bridges one each of the column and row conductors, such as $X_1$ and $Y_1$, crossing at one of the cross points that is adjacent to the series connection. The cross-point elements 1–16 are connected to the first through sixteenth control electrodes $C_1$–$C_{16}$, respectively, as indicated by an arrow again for the first cross-point element 1. The second through sixteenth cross-point elements 2–16 are symbolized by dots with the connection omitted. To cyclically drive the control electrodes 1–16, two cross-point elements arranged along different column and row conductors, such as the cross-point elements 4 and 5, must be selected at a certain time slot. In other words, selection signals must be supplied to a pair of row conductors $Y_1$ and $Y_2$ as well as to a pair of column conductors $X_4$ and $X_1$. It will, however, be seen that spurious cross-point elements 1 and 8 are also selected in this case.

Figure 3:
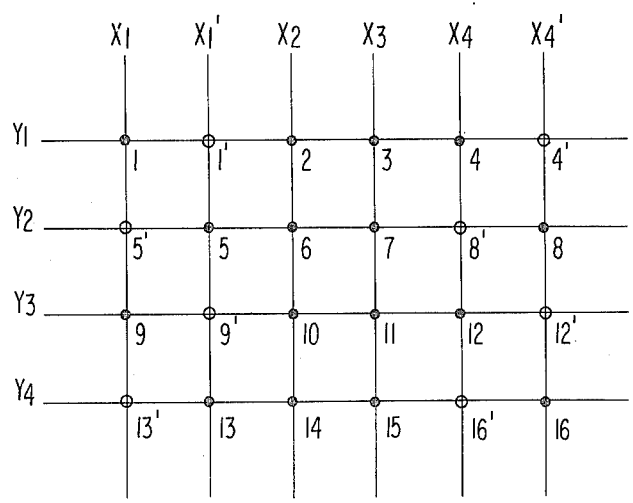
FIG. 3 shows another conventional matrix circuit specifically proposed for use in the recording device depicted in FIG. 1.

Referring to FIG. 3, another conventional matrix circuit proposed to avoid the spurious selection comprises two additional column conductors $X_1'$ and $X_4'$. In this matrix circuit, cross-point elements 1, 4, 9, and 12 are disposed in the manner depicted in the above-referenced FIG. 2. Cross-point elements 5 and 8 are placed adjacent to the cross points of the additional column conductors $X_1'$ and $X_4'$, on the one hand, and the second row conductor $Y_2$, on the other hand. Cross-point elements 13 and 16 are similarly arranged. As symbolized by small circles 1', 4', 5', 8', 9', 12', 13', and 16', no cross-point elements are disposed adjacent to the cross points of the first and fourth column conductors $X_1$ and $X_4$ and the second and fourth row conductors $Y_2$ and $Y_4$. Although the spurious selection is avoided, the matrix circuit is inevitably complicated both in structure and operation.

Figure 4:
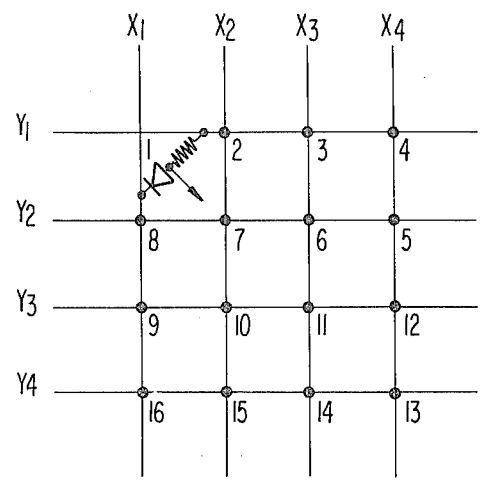
FIG. 4 shows in principle a matrix circuit according to a first embodiment of this invention.

Referring now to FIG. 4, description will be made of principles of a matrix circuit according to a first embodiment of this invention. In the depicted example, the matrix circuit comprises first through fourth column conductors $X_1$–$X_4$, first through fourth row conductors $Y_1$–$Y_4$, and cross-point elements 1 to 16 adjacent the cross-points in one-to-one correspondence with the control electrodes $C_1$–$C_{16}$. The cross-point elements 1–4 bridge the first row conductor $Y_1$ and the successive column conductors $X_1$–$X_4$ reading from left to right. The cross-point elements 5–8 bridge the second row conductor $Y_2$ and the column conductors $X_4$–$X_1$ reading from right to left. As a result, the cross-point elements 4 and 5 bridge the fourth column conductor $X_4$ and the first and second row conductors $Y_1$ and $Y_2$. Likewise, the cross-point elements 9–12 or 13–16 are arranged along one of the row conductors $Y_3$ and $Y_4$ while the elements 8–9 and 12–13 are arranged along the first and fourth column conductors $X_1$ and $X_4$, respectively. In this manner, all of those pairs of the cross-point elements which are to be selected at a time slot are always disposed along only one of the row and column conductors $X_1$–$X_4$ and $Y_1$–$Y_4$. With this arrangement of cross-point elements 1–16, it is possible always to select a pair by selection of only three row and column conductors and it is impossible to simultaneously select three or more elements by the three selected conductors. From FIG. 4, it is understood that the first through sixteenth cross-point elements 1–16 corresponding to the first through sixteenth control electrodes $C_1$–$C_{16}$ of the sequence are arranged along the respective cross-points so as to be traced with one stroke from a starting cross point for the cross-point element 1 or 16 to an end cross point for the element 16 or 1. More specifically, the first through sixteenth control electrodes $C_1$-$C_{16}$ correspond respectively to the first through fourth cross-point elements 1-4 bridging the first row conductor $Y_1$ and the first through fourth column conductors $X_1$-$X_4$ crossing the first row conductor $Y_1$ successively in the above-mentioned one sense, the fifth through eighth cross-point elements 5-8 bridging the second row conductor $Y_2$ and the fourth through first column conductors $X_4$-$X_1$ crossing the second row conductor $Y_2$ successively in the other sense, and the thirteenth through sixteenth cross-point elements 13-16 eventually bridging, in the example being illustrated, the fourth row conductor $Y_4$ and the column conductors $X_1$-$X_4$ crossing the fourth row conductor $Y_4$. In the manner known in the art, each cross-point element may comprise another similarly directed diode in place of the resistor. Alternatively, each cross-point element may comprise another resistor in place of the depicted diode. The column conductors $X_1$-$X_4$ need not be equal in number to the row conductors $Y_1$-$Y_4$. The column conductors $X_1$-$X_4$ need not be parallel to one another and may be arranged on a curved surface, this applies to the row conductors $Y_1$-$Y_4$.

Figure 5:
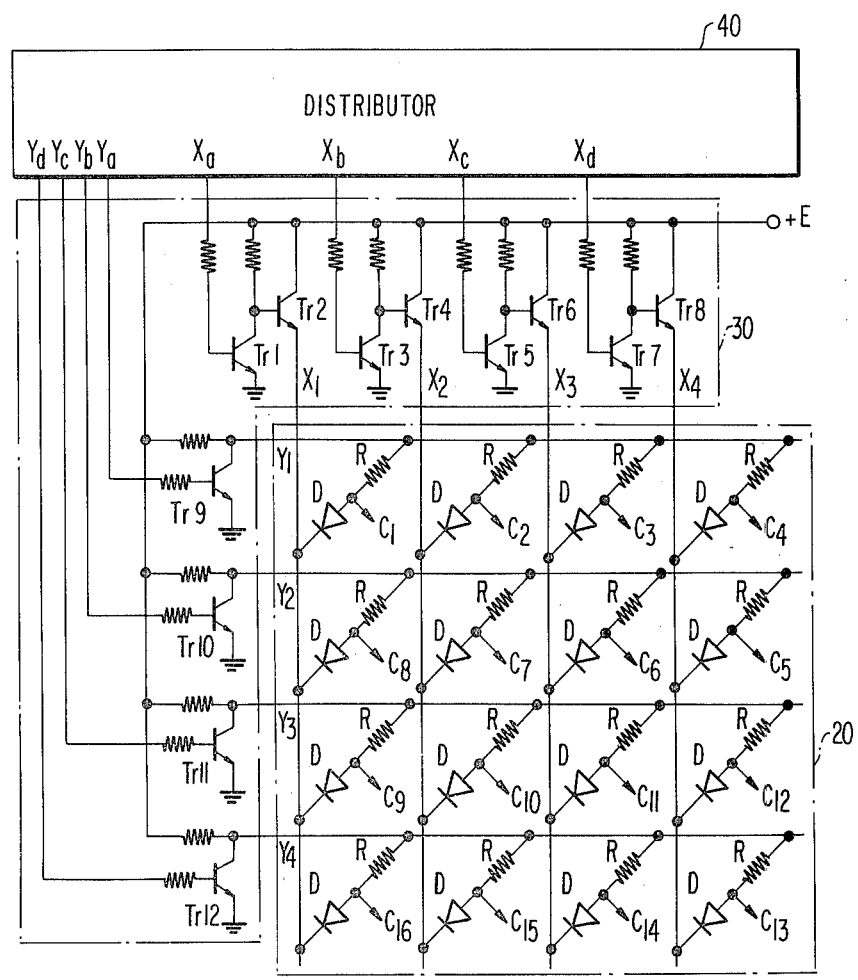
FIG. 5 is a circuit diagram, partly shown by a block, of a matrix circuit according to the first embodiment.

Referring to FIG. 5, a matrix circuit 20 illustrated with reference to FIG. 4 comprises a series circuit of a diode D and a resistor R as each of the cross-point elements connected to the respective control electrodes $C_1$-$C_{16}$. The matrix circuit further comprises a driver circuit 30 and a distributor 40 to supply selection signals selectively to three of the column and row conductors $X_1$-$X_4$ and $Y_1$-$Y_4$ at each time slot. As will later be described, the distributor 40 has first output terminals $X_a$-$X_d$ and second output terminals $Y_a$-$Y_d$ corresponding to the column and row conductors $X_1$-$X_4$ and $Y_1$-$Y_4$ and produces distributor output signals of a first and a second group at the first and second distributor output terminals $X_a$-$X_d$ and $Y_a$-$Y_d$. The distributor output signals become logic "1" and "0" signals in a manner to be presently described with reference to Tables 1 and 2 given hereunder. The driver circuit 30 comprises transistor pairs $Tr_1$, $Tr_2$; $Tr_3$, $Tr_4$, $Tr_5$, $Tr_6$; and $Tr_7$ and $Tr_8$ between the first distributor output terminals $X_a$-$X_d$ and the respective column conductors $X_1$-$X_4$, nearer to the cathodes of the diodes D, and transistors $Tr_9$, $Tr_{10}$, $Tr_{11}$, and $Tr_{12}$ between the second distributor output terminals $Y_a$-$Y_d$ and the respective row conductors $Y_1$-$Y_4$, nearer to the diode anodes. The transistors $Tr_1$-$Tr_{12}$ are supplied with a voltage E.

Figure 6:
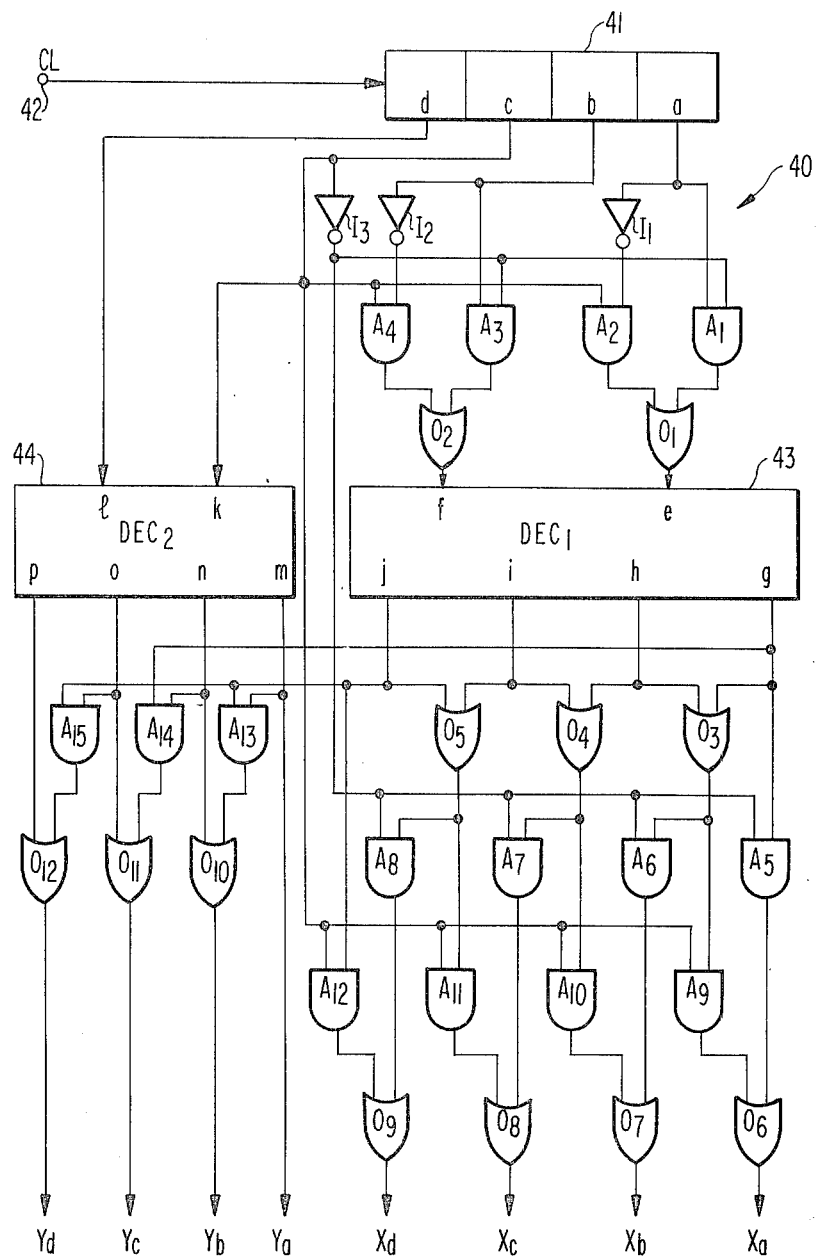
FIG. 6 is a circuit diagram of a distributor illustrated in FIG. 5 by the block.
Figure 7:
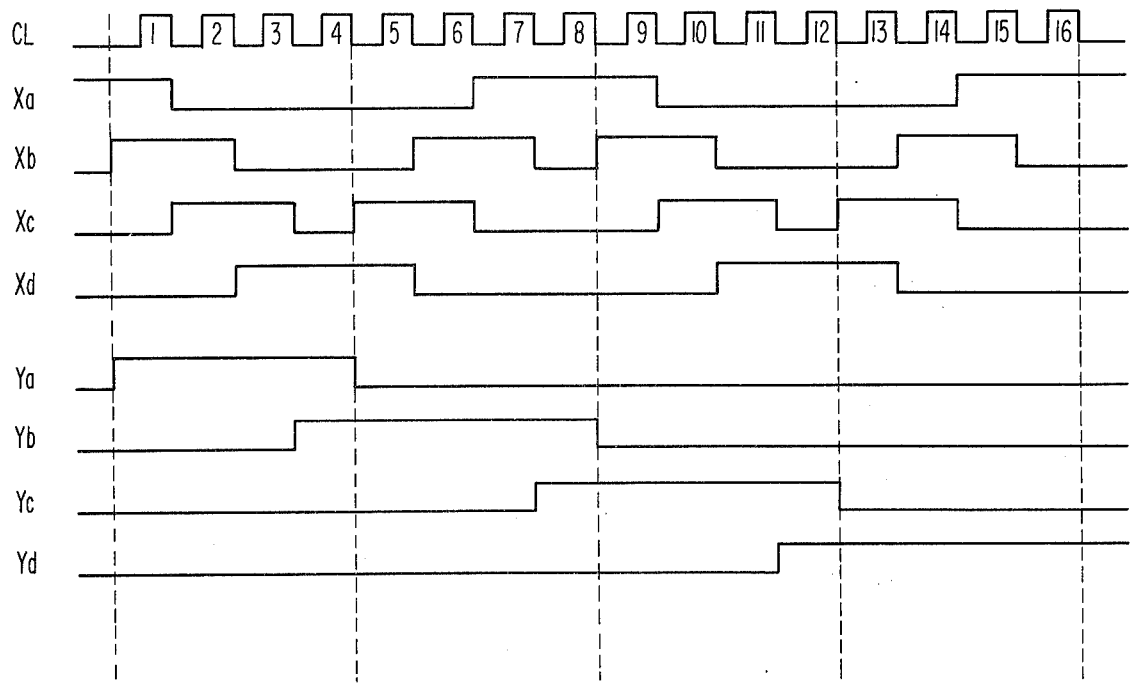
FIG. 7 is a time chart of several signals used in the distributor shown in FIG. 6.

Referring to FIGS. 6 and 7, a distributor 40 for a matrix circuit described in conjunction with FIG. 4 comprises a counter circuit 41 having four stages $a$, $b$, $c$, and $d$ for counting clock pulses CL supplied thereto from a clock input terminal 42 at a repetition period corresponding to the time slots to produce four-bit counter output signals from the respective stages $a$, $b$, $c$, and $d$ which cyclically vary from logic "0000" to logic "1111" through logic "1000," "0100," "1100," ..., and "0111" as given in Tables 1 and 2. The counter output signals except the most significant digit are supplied from the stages $a$, $b$, and $c$ to two input terminals $e$ and $f$ of a first decoder 43 through a first logic circuit comprising AND gates $A_1$-$A_4$, OR gates $O_1$ and $O_2$, and inverters $I_1$-$I_3$ connected as shown to convert the three less significant digit counter output signals into two-bit binary signals in a manner exemplified in Table 1. Responsive to the two-bit binary signals, the first decoder 43 produces first four-bit decoder output signals at its output terminals $g$, $h$, $i$, and $j$ in a manner exemplified also in Table 1. The distributor 40 further comprises a second logic circuit comprising AND gates $A_5$-$A_{12}$ and OR gates $O_3$-$O_9$ controlled by the counter output signal of the most significant digit but one supplied from the stage $c$ of the counter circuit 41 for converting the first decoder output signals into the first-group distributor output signals supplied to the first distributor output terminals $X_a$-$X_d$ as exemplified again in Table 1.

Table 1

| counter outputs | decoder inputs | decoder outputs | distributor outputs |
|---|---|---|---|
| a b c | e f | g h i j | $X_a X_b X_c X_d$ |
| 0 0 0 | 0 0 | 1 0 0 0 | 1 1 0 0 |
| 1 0 0 | 1 0 | 0 1 0 0 | 0 1 1 0 |
| 0 1 0 | 0 1 | 0 0 1 0 | 0 0 1 1 |
| 1 1 0 | 1 1 | 0 0 0 1 | 0 0 0 1 |
| 0 0 1 | 1 1 | 0 0 0 1 | 0 0 1 1 |
| 1 0 1 | 0 1 | 0 0 1 0 | 0 1 1 0 |
| 0 1 1 | 1 0 | 0 1 0 0 | 1 1 0 0 |
| 1 1 1 | 0 0 | 1 0 0 0 | 1 0 0 0 |

Further referring to FIGS. 6 and 7, the two most significant digits of the counter output signals are supplied from the stages $d$ and $c$ to two input terminals $l$ and $k$ of a second decoder 44, which decodes the two more significant digits into second four-bit counter output signals supplied to its output terminals $m$, $n$, $o$, and $p$ in a manner exemplified in Table 2. The distributor 40 still further comprises a third logic circuit comprising AND gates $A_{13}$-$A_{15}$ and OR gates $O_{10}$-$O_{12}$ controlled by those two of the first decoder output signals which are produced at the output terminals $g$ and $j$ of the first decoder 43 for converting the second decoder output signals into the second-group distributor output signals supplied to the second distributor output terminals $Y_a$-$Y_d$ as exemplified again in Table 2. With particular reference to FIG. 7, it will be Table 2

| counter outputs | | | | decoder outputs | | | | distributor outputs | | | |
|---|---|---|---|---|---|---|---|---|---|---|---|
| a | b | c | d | m | n | o | p | $Y_a$ | $Y_b$ | $Y_c$ | $Y_d$ |
| 0 | 0 | 0 | 0 | 1 | 0 | 0 | 0 | 1 | 0 | 0 | 0 |
| 1 | 1 | 0 | 0 | 1 | 0 | 0 | 0 | 1 | 1 | 0 | 0 |
| 0 | 0 | 1 | 0 | 0 | 1 | 0 | 0 | 0 | 1 | 0 | 0 |
| 1 | 1 | 1 | 0 | 0 | 1 | 0 | 0 | 0 | 1 | 1 | 0 |
| 0 | 0 | 0 | 1 | 0 | 0 | 1 | 0 | 0 | 0 | 1 | 0 |
| 1 | 1 | 0 | 1 | 0 | 0 | 1 | 0 | 0 | 0 | 1 | 1 |
| 0 | 0 | 1 | 1 | 0 | 0 | 0 | 1 | 0 | 0 | 0 | 1 |
| 1 | 1 | 1 | 1 | 0 | 0 | 0 | 1 | 0 | 0 | 0 | 1 | understood that only two logic "1" signals are supplied to the second distributor output terminals coupled to two adjacent ones of the row conductors $Y_1$ and $Y_2$, $Y_2$ and $Y_3$, or $Y_3$ and $Y_4$ while only one logic "1" signal is supplied to one first distributor output terminal coupled to one of the column conductors $X_1$, $X_2$, $X_3$, or $X_4$ on driving the fourth, eight, twelfth, or sixteenth control electrode $C_4$, $C_8$, $C_{12}$, or $C_{16}$ as the preceding one of the two consecutive control electrodes. On the other hand, only two logic "1" signals are supplied to the first distributor output terminals coupled to two adjacent ones of the column conductors $X_1$ and $X_2$, $X_2$ and $X_3$, or $X_3$ and $X_4$ at other time slots while only one logic "1" signal is supplied to one second distributor output terminal coupled to one of the row conductors $Y_1$, $Y_2$, $Y_3$, or $Y_4$. It will also be understood that the first-group distributor output signals supplied to the No. 1 and No. 4 first distributor output terminals $X_a$ and $X_d$ become "1" for only one time slot and for as long as three time slots as the case may be, while those supplied to the No. 2 and No. 3 first distributor output terminals $X_b$ and $X_c$, for two time slots.

Figure 8:
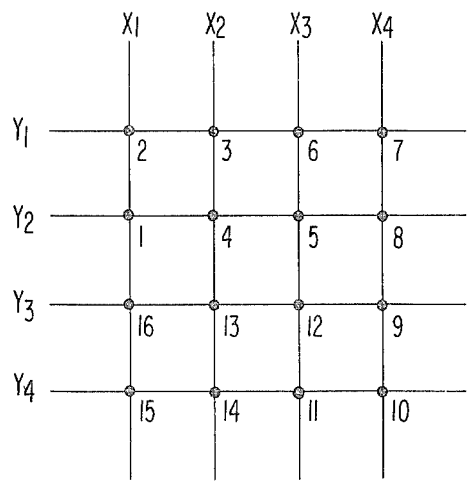
FIG. 8 shows in principle a matrix circuit according to to second embodiment of this invention.

Referring to FIG. 8, a four by four matrix circuit according to a second embodiment of this invention comprises the cross-point elements 1–16 arranged between each pair of the row conductors $Y_1$–$Y_4$ in a serpentine manner while the seventh cross-point element 7 which reaches the fourth column conductor $X_4$ and the following cross-point elements 8–10 are arranged along the fourth column conductor $X_4$ until the tenth cross-point elemtent 10 reaches the fourth row conductor $Y_4$. It will readily be seen that a matrix circuit according to this embodiment should have an even number of row or column conductors.

Figure 9:
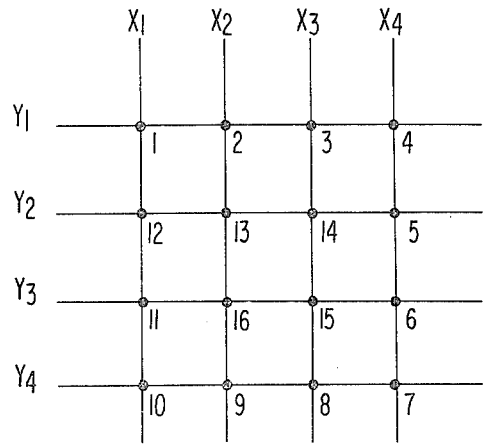
FIG. 9 shows in principle a matrix circuit according to a third embodiment of this invention.

Referring to FIG. 9, a four by four matrix circuit according to a third embodiment of this invention comprises the cross-point elements 1–16 passing through the cross points in a spiral manner.

Figure 10:
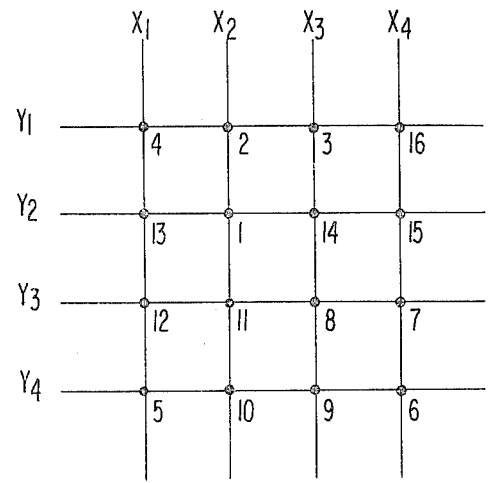
FIG. 10 shows again in principle a matrix circuit according to a fourth embodiment of this invention.

Finally referring to FIG. 10, a four by four matrix circuit according to a fourth embodiment of this invention comprises the cross-point elements 1–16 arranged in a somewhat irregular manner wherein it is impossible to trace the cross-point elements 1–16 for the sequential control electrodes $C_1$–$C_{16}$ with a continuous, uncrossed line. It should, however, be pointed out that two consecutively numbered cross-point elements, such as the cross-point elements 3 and 4 or 4 and 5, are arranged along a common matrix conductor.

It will now be easy for those skilled in the art to arrange the cross-point elements in a number of different manners and to design the distributor 40 suitable to the cross-point arrangement in consideration of an example taught herein with reference to FIGS. 6 and 7. A matrix circuit according to this invention is applicable to an electrostatic recording device of any type provided that the device comprises a sequence of control electrodes along a multiplicity of aligned stylus electrodes.

What is claimed is:

1. In a matrix circuit to be used in an electrostatic recording device comprising a multiplicity of aligned stylus electrodes and a sequence of control electrodes along said stylus electrodes for cyclically driving said control electrodes at successive time slots, with two consecutive control electrodes in said sequence driven at each of said time slots and with one of the two consecutive control electrodes next following in said sequence the other of the two consecutive control electrodes continuously driven at the next succeeding time slot together with the control electrode next following in said sequence said one of the two consecutive control electrodes, said matrix circuit comprising a plurality of conductors of a first set, a plurality of conductors of a second set successively crossing said first set of conductors without ohmic contact therewith to form a plurality of cross points, and a plurality of cross-point elements adjacent the respective cross points in one-to-one correspondence with said control electrodes, each of said cross-point elements bridging one each of said first and second set of conductors crossing at one of said cross points adjacent to said each cross-point element, said matrix circuit further comprising means for supplying selection signals selectively to said first and second set of conductors to select a pair of said cross-point elements at each of said time slots, said cross-point elements driving the corresponding control electrodes when selected, the improvement wherein all of said cross-point elements to be selected in pair are arranged to bridge one of the conductors of one of said first and second sets and two respective ones of the conductors of the other of said sets.

2. A matrix circuit as claimed in claim 1, said first set of conductors being at least three in number, wherein the cross-point elemtents bridging a first of the outermost ones of said first set of conductors and the second set of conductors successively in one direction along a predetermined one of said first set of conductors, the cross-point elements bridging one of said first set of conductors that is next adjacent to said first outermost one of said first set of conductors and the second set of conductors crossing said one first set of conductors successively in the opposite direction, and the cross-point elements eventually bridging a second of the outermost ones of said first set of conductors and the second set of conductors and the second set of conductors crossing said second outermost one of said first set of conductors successively in said one and said opposite directions according as the number of said first set of conductors is odd and even, respectively, correspond to the respective control electrodes of said sequence.

3. A matrix circuit as claimed in claim 2, the conductors of each of said first and second sets being four in number, wherein said means comprises distributor means having four first and four second distributor output terminals for producing in response to clock pulses of a repetition period corresponding to said time slots distributor output signals of a first and a second group at said first and second distributor output terminals, respectively, said distributor output signals varying between two logic values, said means further comprising supply means for supplying said first and second group of distributor output signals with the logic values of the distributor output signals of a predetermined one of said first and second groups reversed to said first and second set of conductors, respectively, said distributor means comprising counter means for counting said clock pulses to produce counter output signals of four binary digits, said counter output signals varying cyclically from decimal zero to decimal fifteen, said distributor means further comprising logic means reponsive to said counter output signals for successively giving one of said logic values to those two of said first group of distributor output signals which are supplied by said supply means to adjacent two of said first set of conductors while giving said one logic value to each of said second group of distributor output signals and for giving said one logic value to one of said first group of distributor output signals that is supplied by said supply means to the first set of conductor crossing said second set of conductors at either end of said directions while giving said one logic value to those two of said second group of distributor output signals which are supplied by said supply means to two adjacent ones of said second set of conductors, the distributor output signals of said one logic value serving as said selection signals.

4. A matrix circuit as claimed in claim 3, wherein said logic means comprises a decoder having four first decoder output terminals for supplying No. 1 through No. 4 first decoder output signals to said first decoder output terminals, respectively, and a second decoder having four second decoder output terminals for supplying No. 1 through No. 4 second decoder output signals to said second decoder output terminals, respectively, each of said first and second decoder output signals capable of being rendered logic "1" and logic "0," said logic means further comprising a first logic circuit responsive to the counter output signals except the counter output signal of the most significant digit for making said first decoder successively render said No. 1 through No. 4 first decoder output signals logic "1" and render other first decoder output signals logic "0" during a first half of an interval during which the counter output signal of the most significant digit but one assumes one of said logic values and successively render said No. 4 through No. 1 first decoder output signals logic "1" and render other first decoder output signals logic "0" during a second half of said interval, and a second logic circuit supplied with said first decoder output signals and controlled by the counter output signal of the most significant digit but one for supplying said first-group distributor output signals to said first distributor output terminals, said second decoder being responsive to the counter output signals of the two most significant digits to successively render said No. 1 through No. 4 second decoder output signals logic "1" and render the other second decoder output signals logic "0" said logic means still further comprising a third logic circuit responsive to said first and second decoder output signals for supplying said second-group distributor output signals to said second distributor output terminals.

* * * * *